March 28, 1933.   A. H. OELKERS   1,902,910
ANTIFRICTION WHEEL AND AXLE CONSTRUCTION
Filed April 11, 1927    4 Sheets-Sheet 1

Inventor
Alfred H. Oelkers,
By Wilkinson, Huxley, Byron & Knight
Attys.

Patented Mar. 28, 1933

1,902,910

UNITED STATES PATENT OFFICE

ALFRED H. OELKERS, OF CHICAGO, ILLINOIS, ASSIGNOR TO AMERICAN STEEL FOUNDRIES, OF CHICAGO, ILLINOIS, A CORPORATION OF NEW JERSEY

ANTIFRICTION WHEEL AND AXLE CONSTRUCTION

Application filed April 11, 1927. Serial No. 182,734.

This invention relates to railroad car wheel and axle construction, and more particularly, wheel and axle construction which embodies anti-friction bearings for the wheels.

One of the objects of this invention is to provide wheels and axles for use on railroad trucks, such as used under freight cars, passenger cars and locomotive tenders, which permit a simple and practical application of anti-friction bearings without alterations in the other parts of the truck, thereby making it possible to convert any of the trucks now using the standard type of wheels and axles such as A. R. A. wheels and axles, to roller bearing trucks; also, to permit such change to be made by merely exchanging the A. R. A. wheel and axle assembly for the roller bearing type.

Another object is to provide for a replacement of defective wheels in a truck in the exchange of freight cars and other equipment over various railways without the necessity of having available the roller bearing type of axles at the location of repair whereby such complete interchangeability affords a practical means for gradually replacing the friction bearings now used with anti-friction bearings.

Another object of my invention is to provide in a wheel and axle construction the features enumerated in the above stated objects, which may selectively receive either the anti-friction bearing and a stationary axle to be mounted in the customary journal boxes, or a journal bearing part to be fixed relative thereto and providing a journal bearing adapted to be mounted in the customary journal boxes.

Another object is to provide a construction which permits a more satisfactory application of anti-friction bearings without increasing the weight of the truck, and preferably one which reduces the weight of the truck a substantial amount whereby an added advantage is realized in that economy of transportation is promoted in addition to the greater economy afforded by using the lower frictioned roller bearing.

A further object is to provide a roller bearing application having a relatively large space for carrying and circulating the lubricant.

A further object of my invention is to provide a method for assembling the wheel and axle construction of the type contemplated in my invention, whereby the proper clearance is assured.

A further object of my invention is to provide a wheel and axle assembly interchangeable with the standard A. R. A. type which can be completely adjusted and lubricated for service before it is placed in the truck and also, one having the same outside general dimensions as the standard A. R. A. type and being placed in a car truck by exactly the same method of assembling a truck as previously employed.

Accordingly, my invention proceeds along the principle of providing a tubular axle on which the wheels are removably fixed, the tubular axle being constructed to receive selectively either anti-friction bearings and a stationary axle therethrough, or a journal bearing part constructed for engagement with the customary journal box carried on the truck side frame.

In addition, I have provided many structural features which will be manifest from an understanding of the invention and among which are the features of providing between the outer revolving and an inner stationary axle in the roller bearing assembly, sufficient space in which to install roller bearings of the various successful types now in use; also, of providing a space between the revolving and stationary axles which is of a larger diameter than the space available within the present standard journal boxes and thereby permits larger and more efficient designs of various types of roller bearings, and in addition, permits the use of a complete and self-contained roller bearing made reasonably tight against leakage of lubricant without requiring special lubricant retainers.

Further, there is provided a wheel and axle assembly having roller bearings which may be applied to any present standard A. R. A. type of journal box and which carries the weight in the same position as the A. R. A. type truck and uses the old standard journal bearing wedge for supporting the weight and for holding the wheels in position against lateral movement. Also, one which is capable of complete adjustment for service independent of assembly in the usual standard truck frames and which permits removal of the wheels from the axle and application of new wheels without disturbing adjustment of the roller bearings and loss of the bearing lubricant.

These and other objects are accomplished by means of the arrangement disclosed on the accompanying sheet of drawings, in which—

The various novel features of the invention will be apparent from the following description and drawings and will be particularly pointed out in the appended claims.

Figure 1:
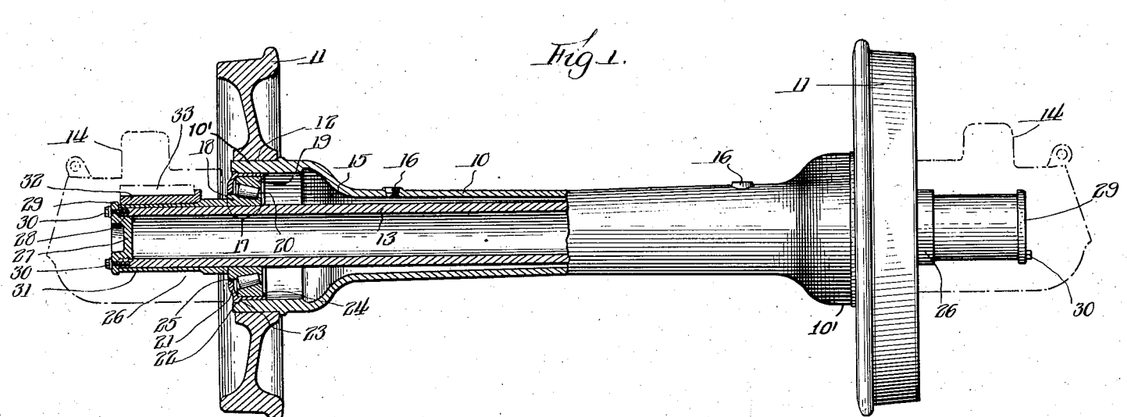
Figure 1 is a side elevation of wheel and axle assembly, shown partially in cross section, constructed in accordance with my invention.

Referring to the drawings, it will be noted that my invention contemplates the employment of an outer flared tubular axle member 10 having enlarged end portions 10' and on which are mounted wheels 11 having a pressed fit as at 12 therewith limited by the annular flange 100 so that the wheels and axle function as an integral member or spool unit in service, but which provides means for permitting the wheels to be removed from and replaced on the axle when desired. By terminating the inner axle within the planes through the inner and outer edge of the wheel defining the tread surface, it is permitted that this construction be used with the standard A. R. A. truck and journal boxes as shown so that no radical changes need be made on existing equipment. Positioned through the tubular axle 10 is a second tubular axle 13 which extends beyond the ends thereof in a manner to form a suitable support to be mounted in customary journal boxes 14 by mechanism hereinafter described, though it is to be understood that a mounting may be used such as a special journal box or a direct frame mounting. The inner axle may be fixed, semi-fixed or floating, as desired. The tubular axle 13 is spaced from the axle 10 to form a chamber 15 in which lubricant is carried, the lubricant being introduced into the chamber through suitable openings closed by plugs 16. The outer end of the axle 13 is provided with a portion 17 which is finished to form an exact fit for the cone or inner raceway 18 of an anti-friction bearing. The anti-friction bearing comprises in addition to the inner raceway, the outer raceway 19, between which are positioned suitable roller bearings 20. The outer raceway is held in the bearing housing member 21 which is retained in the outer end of the tubular axle 10 by a pressed fit, said member 21 having a projection 22 engaging the shoulder 23 formed on the interior of the axle whereby limited inward movement is provided. The inner end of the housing member 21 is flanged over as at 24 to lock therein the outer race member 19, and roller bearings of any suitable construction may be provided with cages for maintaining their circumferential spacing. The inner end 25 of the housing member has a loose fit with respect to the inner axle 13 so that it may freely rotate relative to the inner race ring 18 and is provided with a plurality of grooves so that it may serve as opposing means at the end of the axle to prevent the escape of lubricant, the grooves serving as oil catching grooves to aid in this function. Although the anti-friction rollers have been shown with the large ends disposed outwardly, it is understood that the bearings may be reversed, in which case the shoulder (not numbered) on the inner axle, and the inwardly directed flange of the cover plate (Figures 5 and 6) may be used as positioning means.

Positioned over the outer end of the axle 13 is a sleeve 26 having its inner end in abutment with the inner race ring 18, the outer end of the sleeve being in abutment with a cap member 27 which is in screw threaded engagement as at 28 with the interior of the axle 13. The cap member is provided with overhanging flanges 29 for abutment with the sleeve 26 whereby when the cap is screwed inwardly, an inward movement is imparted to the inner race ring 18 so as to effect adjusting positioning thereof. The cap member further serves as a locking means for maintaining the inner race ring in its adjusted position and for this purpose is provided with screws 30 adapted for screw threaded engagement with the axle 13, the cap member having a plurality of circumferential holes whereby the screw may lock the cap in any one of a plurality of angular positions. The sleeve 26 has a reduced end portion 31 which is adapted to receive the bearing plate 32 on its upper surface which bears against and is held by the usual standard bearing wedge 33.

Figure 2:
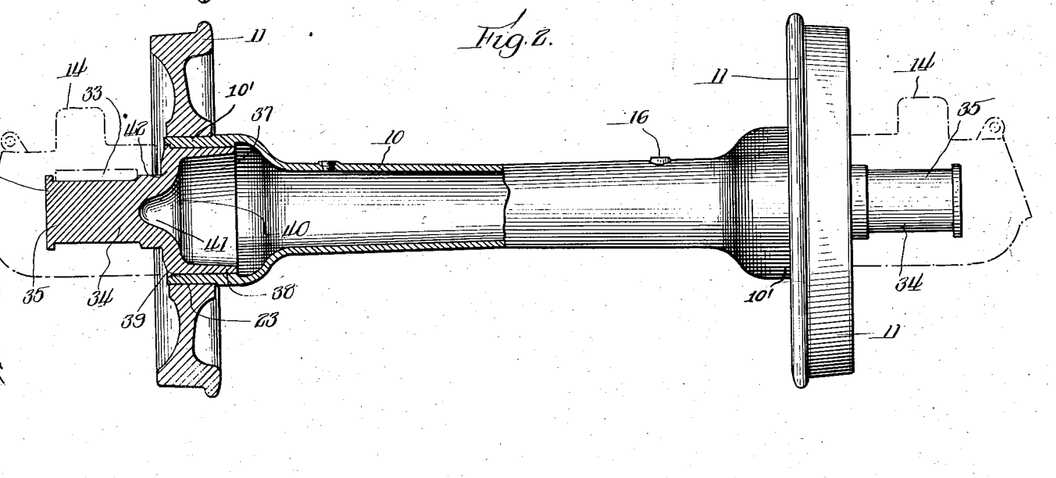
Figure 2 shows a side elevation of the alternative assembly, in which the journal portion of the bearing is supplied in the end of the axle, rendering the construction interchangeable in installation for use with friction bearings.

Referring now to Figure 2, it will be noted that the axle portion 10 is similar to that described in connection with Figure 1, and the wheels 11 are mounted in the same manner, the difference between the two assemblies being that the stationary axle 13 and the anti-friction bearings described in connection with Figure 1, have been omitted, and in place thereof, a journal axle portion 34 has been substituted in the end of the tubular axle 10. The journal portion 34 has a projecting hub 35 provided with the customary flange 36 adapted to seat in bearing relation on the journal wedge 33 in the journal box 14. The inner end of the journal axle portion is provided with a cup-shaped portion 37 adapted to be secured in the end of the axle 10 by a pressed fit as at 38, the axle portion having a projection 39 adapted to abut the shoulder 23 provided on the interior of the axle. The cup portion 37 of the axle member 34 is hollowed out to provide the internal shoulder 40 and a cavity 41 whereby a web portion 42 between the journal hub and the pressed fit cup portion is provided. It will be noted that the cavity 41 projects out beyond the outer end of the tubular member 10 whereby when it is desired to remove the hub member 34 from the axle 10, the web portion 42 may be cut to give access to the interior and any rim formed subsequently removed with comparative ease.

At this point, it may be well to note the design of the outer axles employed in the assemblies. It will be seen that these axles are flared from the center outwardly. Many advantages accrue from such design for not only does such configuration form a means for directing the lubricant towards the bearings when the assembly is inoperative but it forms a means whereby the lubricant is centrifugally pumped towards the bearings when the assembly is in operation. There are also structural advantages in this type of axle brought out particularly by considering the stresses set up in the assembly when a car is negotiating a curve. The maximum stress is set up in the axle at the junction of the wheel and axle remote from the center of curvature of the track and tapers to a much less stress in the other or near axle. Conversely, a similar stress is attained when the curve is reversed and the meeting or intersection of these stress diagrams determines the maximum stress at the center of the assembly. If then this were plotted, the shape of the axle necessary to satisfactorily accommodate such stresses would conform substantially to the shape shown, i. e., flaring outwardly from the center. When an axle of this sort is used, it also precludes the necessity of applying new or special draft or brake gear as this shape readily lends itself to accommodate the standard brake rods, etc.

Figure 3:
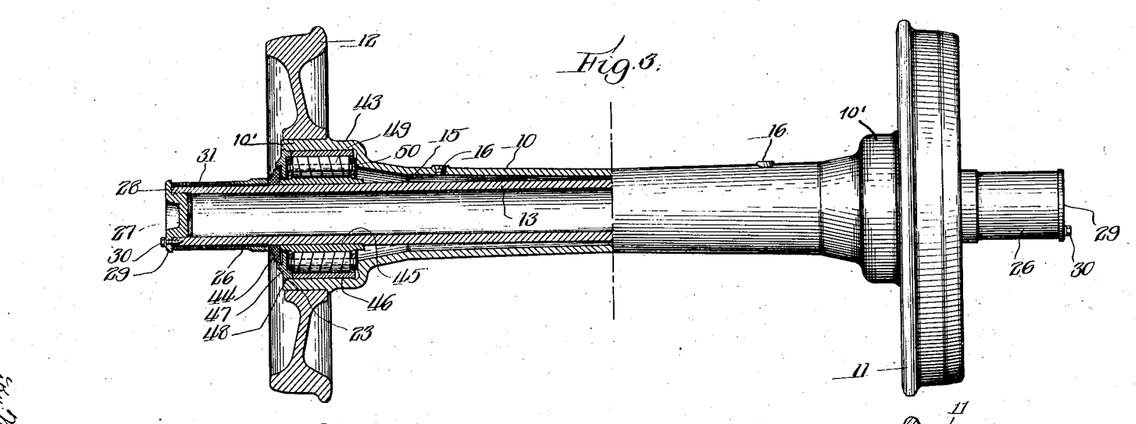
Figures 3 and 4 are showings similar to Figure 1, disclosing modifications in the type of anti-friction bearing employed in the assembly.

Referring now to Figure 3, it will be noted that the structure is similar in many particulars to the anti-friction assembly shown in Figure 1, but is one which is adapted for a different type of anti-friction bearing. The outer tubular axle 10 is of the same general structure, having an enlarged end 43 adapted to accommodate bearings suitable for radial loads only. In this modification, the sleeve 26 abuts the thrust bearing ring 44 which in turn determines the position of and maintains in adjusted position the inner raceway 45. The outer raceway 46 is positioned in the interior of the enlargement 43 on the end of the axle 10 but has in abutment therewith the combined thrust ring and bearing housing member 47, this ring being provided with a projection 48 having engagement with the shoulder 23 provided in the internal surface of the axle 10. The roller bearings 49 are positioned between the inner and outer raceways and are maintained in spaced relation by suitable cage construction 50. In this type of device, it can be seen that adjustment of the cap 27 by means of the internal threads 28 and the bolt 30 and through the instrumentality of the sleeve 26, will provide an adjustment for the inner raceway 45 and also adjustment of the thrust ring 44 relative to the second thrust ring 47, whereby lateral movement between the outer axle 10 and wheels is taken up relative to the inner axle 13. A chamber 15 similar to that shown in Figure 1, is provided for the lubricant in this modification, the opening in the chamber being closed by the plug 16.

Figure 4:
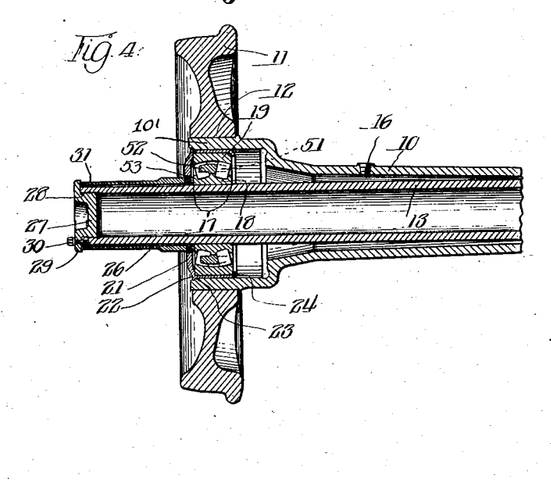

Referring to Figure 4, it will be noted that this modification is substantially similar to that disclosed in Figure 1, except for the type of roller bearing mounted between the stationary and rotating axle. In the type shown in Figure 1 the bearing rollers are tapered and are adapted to take the thrust in one direction only, the bearings at the opposite ends of the axle being positioned in opposed relation so that the thrust in the two directions will be taken at one end of the axle in one direction, and the other end of the axle in the opposite direction. The roller bearings 51 shown in Figure 4 are mounted between the outer race ring 19 which has a hemispherical bearing surface and the inner race ring 18 which is provided with a double groove for receiving two sets of rollers. The rollers are positioned at an angle to each other to have surfaces of a similar configuration to that of the bearing surface of the outer race ring and are held in suitable spaced relation by the cage member 52. Each bearing in this instance is adapted to support radial loads and thrust loads in both directions, and in this particular is different from the type shown in Figure 1.

Attention is further called to the fact that a ring 53 is positioned between the inner end of the sleeve 26 and the inner race ring 18 which ring may be of any desired size so that the proper positioning of the inner race ring may be effected. In the event the bearing is to be moved further inwardly, a larger ring 53 will be substituted for the one shown and vice versa.

Figure 5:
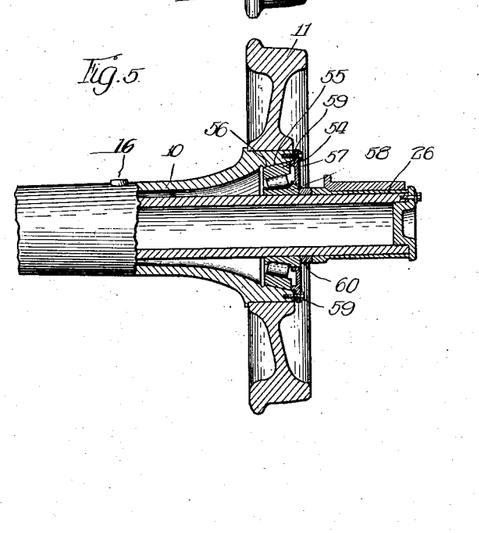
Figure 5 is a view similar to Figure 1, disclosing one-half of the axle in which the outer race ring has a tapered outer surface incorporated with a tapered seat in the rotating axle.

Referring now to Figure 5, I have disclosed a further modification of my invention in which the outer race ring has a tapered outer surface adapted to seat in a conical opening provided in the rotating axle. It has been found in practice, that it is desirable to remove the wheels 11 for the purpose of replacement without disturbing the roller bearing, in that it is frequently true that the wheels wear more rapidly and require replacing sooner than the anti-friction bearings. The wheels 11 as above described, are mounted on the outer end of the axle by a pressed fit and in replacing wheels, there is sometimes a very small difference, which cannot be avoided, in the size of the hub opening. Due to this variance the inner dimension of the end of the rotating axle 10 varies slightly according to the particular wheel mounted on its outer surface in that the pressed fit causes a slight inward deflection of the axle end. When bearings of the type disclosed in Figures 1, 3 and 4 are used, this slight difference in the dimension of the inner surface of the axle makes it more difficult to properly seat the outer race ring of the bearing in position. To eliminate this feature I have provided in the modification of my invention shown in Figure 5, an outer race ring 54 which has a tapered outer surface 55 adapted to seat against the tapered surface 56 provided on the inside face of axle 10, and which permits proper seating and proper take up necessary by wear of the bearing by inward axial movement. The housing member 57 projects inwardly in a manner to closely surround the inner race ring 58 similar to that shown in Figures 1 and 4, but is preferably attached to the end of axle 10 by means of the bolt 59. In this form like in Figure 4, the blocking member or ring 60 is provided between the end of the sleeve 26 and the inner race ring 58. When it is desired to convert the assembly shown in Figure 5 into the friction type shown in Figure 2, the inner tapered face of the axle 10 is bored out to provide a cylindrical surface to receive the cup portion of the journal member.

Figure 6:
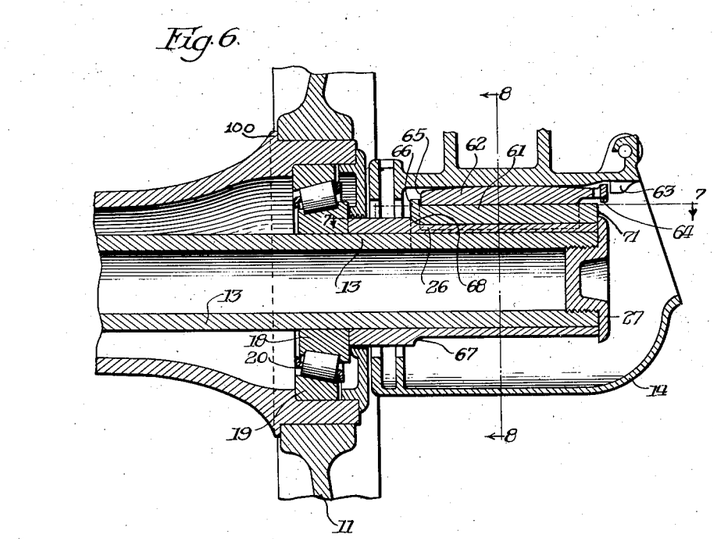
Figure 6 is a side elevation in cross section disclosing the journal box construction with the wedge and bearing plate and the manner in which the stationary axle cooperates therewith.
Figure 7:
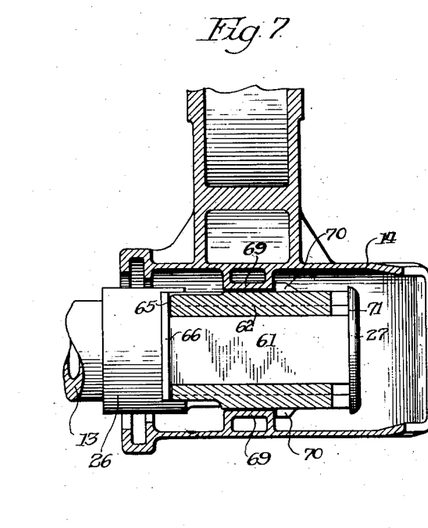
Figure 7 is a plan view in cross section taken on the line 7—7 of Figure 6.
Figure 8:
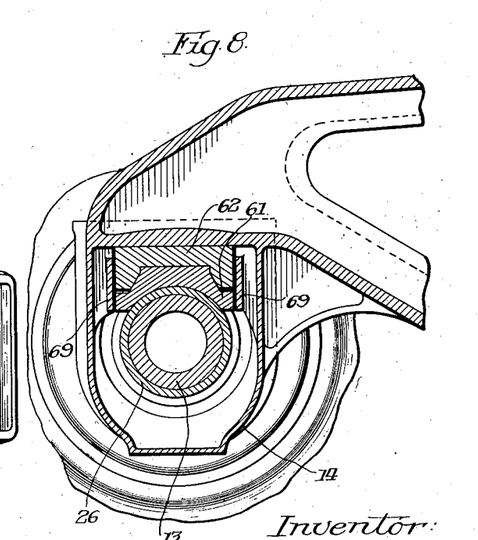
Figure 8 is an end elevation in cross section taken on the line 8—8 of Figure 6.

Referring now to Figures 6 to 8 inclusive, it will be noted that my anti-friction wheel and axle assembly is completely interchangeable with the standard A. R. A. journal bearing and box construction, in that the ends of the stationary axle and the sleeve member 26 seat on the bearing plate 61, and wedge member 62 which are the same members used for the standard A. R. A. journal construction and as disclosed in these figures means are provided for transmitting the axial thrusts from the journal box through the wedge and bearing plates to the outer end of the stationary axle 13. The journal box 14 is provided with a lug 63 depending from its upper surface and in a position to cooperate with the abutment 64 provided on the outer end of the wedge plate 62. The inner end 65 of the wedge plate cooperates with the upwardly projecting flange 66 on the inner end of the bearing plate 61 in a manner to impart thrust in the inward direction thereto. The bearing sleeve is constructed with a circumferential shoulder 67 which engages the shoulder 68 provided on the under surface of the bearing plate 61. These various parts cooperate to impart thrust in an inward direction from the journal box to the sleeve 26 and to the inner race ring where it is taken by the anti-friction bearing. One advantage in taking the thrust in this manner is that the movement of the sleeve 26 inwardly imparts a thrust to the inner race ring around its entire circumference so that the thrust is taken by the anti-friction rollers equally around the entire bearing.

Referring to Figure 7, it will be noted that the journal box 14 is also provided with inwardly projecting lugs 69 at its opposite sides which cooperate with the lateral lugs on bearing plate 61. The outer end 71 of the bearing plate 61 engages and cooperates with the flange on the cap 27 attached to the end of the stationary axle 13, in a manner to impart thrust in the outward direction to the axle. Thrusts in this direction will be imparted to the bearing at the opposite side of the car through the inner race ring where they will be taken by the anti-friction bearings.

Figure 9:
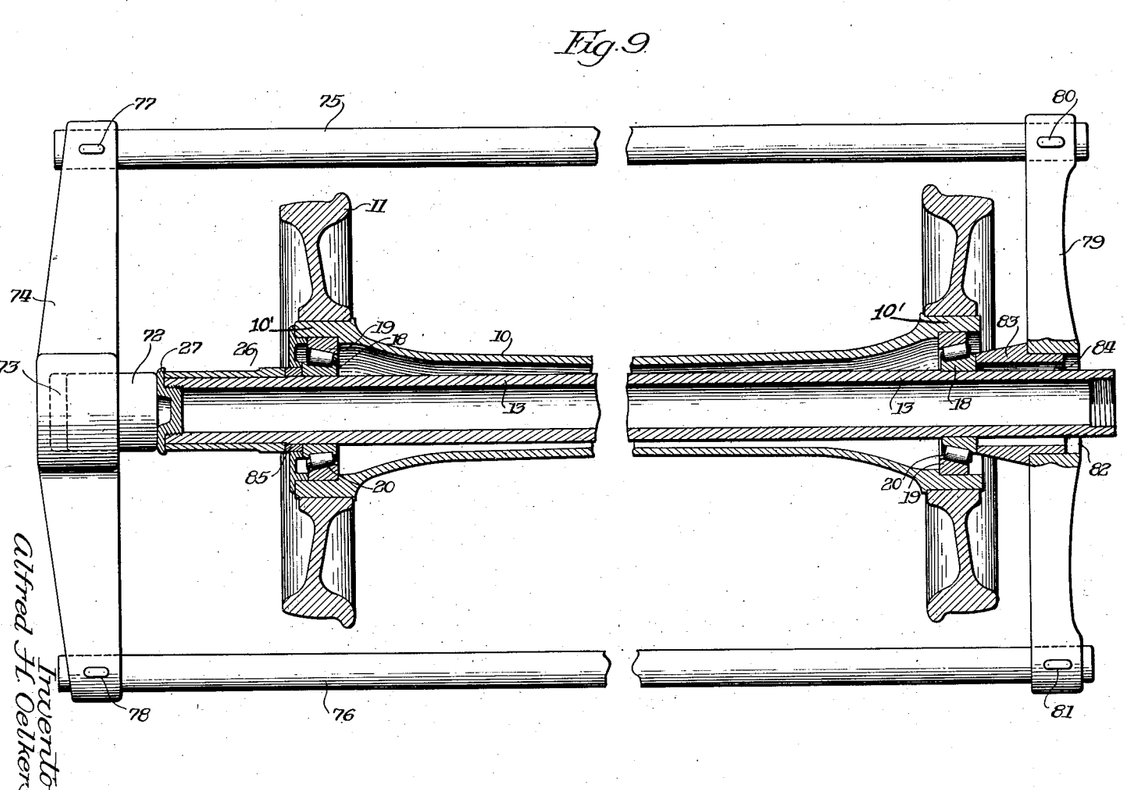
Figure 9 is a cross sectional view of the wheel and axle assembly constructed in accordance with this invention, having a wheel press mounted in engagement therewith disclosing the method of assembling the parts of the wheel and axle.

Referring to Figure 9, I have disclosed a wheel and axle assembly constructed in accordance with my invention together with a wheel press used for assembling the parts in an operative manner. Due to the very heavy uses to which anti-friction bearings are subjected in railroad cars, it is necessary to have a very accurate adjustment between the anti-friction bearing parts. If manual adjustment is relied on, detrimental results are apt to occur due to the fact that the parts are so large and heavy and they sometimes get stuck in a position where too much clearance is provided. It is one of the features of my invention to provide a means for assembling the parts utilizing a wheel press or other similar means as shown in the drawings. The purpose of this is to place the parts by excessive pressure under compression and to subsequently, permit the parts to expand in amounts sufficient to provide the necessary clearance and to finally lock the parts in a final expanding position. This assures the correct amount of clearance and eliminates any possibility of the parts being stuck or assuming incorrect relative positions. To assemble the parts, one end of the stationary axle is placed in abutment with the block element 72 which is held in a socket 73 provided in the yoke 74 of the wheel press. Attached at the opposite ends of the yoke are two longitudinal bars 75 and 76 connected by means of pins 77 and 78. At the opposite ends of the bars is a second yoke member 79 connected by means of the pins 80 and 81. The yoke 79 is provided with a central opening 82 which receives the pressure collar 83 having its inner end in engagement with the inner race ring of the anti-friction bearing. The pressure collar has a central opening 84 of sufficient size to permit the extending end of the stationary axle 13 and collar 26 to project therethrough. Suitable means are provided, not shown, for applying pressure to the yoke element 79 in a manner to draw the two yokes together.

Prior to the introduction of the axle assembly into the wheel press, the end plug 27 is placed in the end of the axle and the sleeve 26 is placed in abutment therewith. The ring 85 as shown in Figure 9 is placed on the axle and serves as a spacing means between the sleeve and the anti-friction bearing at one end. The anti-friction bearings and the outer tubular axle are then placed on the inner stationary axle. With the parts thus positioned the pressure collar 83 is placed in abutment with the inner race ring and the pressure is applied.

It will be understood that the sleeve 26 and the ring 85 determine the relative spacing between the end of the axle and the anti-friction bearing at that end and that all movement effected by the pressure will necessarily be to the left as shown in Figure 9. The pressure which is applied is calculated and from the compression effected by this pressure, the correct amount of clearance necessary for the parts is estimated and a sleeve of correct length similar to the sleeve 26 is placed on the right end of the axle and locked in position.

It will be understood that a ring similar to that shown in 85 may be employed if desired so that all of the sleeve members 26 may be of the same size. The wheel press is then released and the parts permitted to expand through the clearance provided at which point they are locked against further movement. This expansion provides the exact clearance necessary and assures that the parts are in the desired operative relation.

From the above description, it can be understood in operation that the anti-friction wheel and axle construction herein provided may be installed in any standard journal type of railroad truck and that when the anti-friction assembly is provided, the outer ends of the axle 13 are maintained in a stationary manner in the customary journal boxes for supporting the load of the car. The outer axle 10, which serves also in the capacity of a housing, rotates with the wheels relative to the stationary axle 13 on the anti-friction bearings provided, it being understood that the bearings may be of any suitable type or may be of the types shown in Figures 1, 3 and 4. The type of bearing shown in Figure 1 is adapted to support radial loads and thrust loads in one direction, the thrust loads in the opposite direction being taken on the bearing at the opposite end of the axle. The type shown in Figure 3 provides anti-friction bearings for radial loads only, but is provided at each end with a friction thrust bearing, each of which takes a load in one direction, the bearing at one end taking the load in the opposite direction from the bearing in the opposite end.

Referring to Figure 4, each bearing disclosed in this structure is adapted to support radial loads and thrust loads in both directions—and also the ring 53 is provided between the sleeve 26 and the inner race ring for determining the position of the inner race ring.

Referring to Figures 5 to 8 inclusive, with the understanding that the journal box, the bearing and wedge plates are of the standard A. R. A. type for journal bearings, the complete interchangeability of the axle construction set forth in my invention with that of the A. R. A. journal type will be appreciated. In addition to the structural advantages set forth, it will be obvious from this disclosure, that advantages are realized in the method of assembly which employs a wheel press or other means for effecting an initial compression of parts.

In the event that it is desired to replace the wheels without replacing the bearings therefor, it is merely necessary to remove the wheels 12 from their pressed fit on the enlarged ends of the axle 10 and to place new wheels thereon which may be done without affecting the adjustment or assembly of the bearing structure in any manner. The bearing structure and axle, it will be noted, are constructed as a unit and may be removed from the journal boxes in exactly the same manner as the removal of the wheel and axles of the customary journal type is made.

In the event that it is desirable to provide the friction type of bearing as shown in Figure 2, it is merely necessary to provide the journal hub portion 34, which is inserted with a pressed fit in the end of the tubular axle 10 and mounted in a manner similar to mounting the axles in customary journal boxes. It can be understood from this that railway stock now in use in replacing wheels may be supplied with wheels and axles of the type shown in Figure 2, whereby the expense of equipping them with roller bearings is eliminated, but they being provided with a wheel and axle which may be readily converted into the antifriction type of bearing when it is desired to do so.

As referred to above, in order to remove the journal hub 34, it is merely necessary to cut the web portion 42 to gain access to the interior of the hub structure, which renders it comparatively easy to subsequently remove the ring portion of the cup-shaped end. In order to adjust the bearing to take up lateral play between the outer axle and wheels 10 and 12 and the inner axle 13, it is merely necessary to loosen the bolt 30 and screw up the cap member 27 in a manner to impart a lateral thrust on the sleeve 26 to effect a movement of the inner race ring of the bearing, this being true in all three disclosures in which anti-friction bearings are employed. If the take up is large or the initial position warrants it, additional rings of the desired size may be inserted between the inner race ring and the sleeve 26 as shown in Figures 4, 5 and 9. Chamber 15 provides an enlarged cavity for the storing and circulating of lubricant which is in full contact with the roller bearings at all times and which is prevented from escapement by the housing member or combined housing member and thrust rings 21 and 47, as shown in Figures 1 and 3. The circumferential inner grooves serve to prevent the escape of lubricant.

By this arrangement, an axle complete with roller bearings is provided which receives the car wheel on a press fit in the same manner as the standard solid axle now used and which permits renewal of the wheels without in any manner dismantling or changing the adjustment of the roller bearings. It will also be noted that the outer tubular axle revolves around the inner tubular axle and that wheels are provided with an inner hub diameter of about double the present A. R. A. standard type, which provisions afford an assembly with roller bearings of less weight than the A. R. A. type of axle construction. The form of invention disclosed affords a complete assembly which in service has the advantage of being more easily inspected than other types of roller bearing applications heretofore used, it being apparent that the general condition and extent of lubricant may be judged by an inspector without dismantling any part of the device and from a point of vision outside of the railway truck. The design permits the use of the A. R. A. standard journal box and all of its attachments so that it is kept ready for exchange of the A. R. A. wheels and axles without special tools or parts and by the usual present procedure of exchanging wheels at repair points. The device is of such design that lateral adjustment of the roller bearing on each side of the truck is governed by length of the inner stationary axle and that such adjustment is in no manner disturbed unless it is necessary for attention to the roller bearing itself. I have further provided in the alternative construction of my invention, in which the wheel and axle assembly is employed in connection with a roller bearing assembly capable of use on cars not equipped with roller bearings, wheels having enlarged hub diameters and tubular axle so that at any time a railway desires to convert their trucks to the roller bearing type, they may readily do so without affecting the wheels and by merely inducting the stationary inner axle and bearings to operate within the tubular axle and wheels previously provided.

The complete assembly provides a construction in which the material in the axle and wheels is distributed to more efficient proportions than the present A. R. A. type of axle and wheels, the axle proper receiving the large wheel hub by pressed fit and when assembled, extends full distance between the inner faces of the wheel hubs. This axle is tubular in form and is of the same design and dimensions as used with the roller bearing application. When desired to use the A. R. A. standard type of friction bearing either before or after roller bearings have been used, the journal ends are forced into the outer ends of the tubular axle by an ordinary press fit, thereby forming a complete wheel and axle assembly having the same general dimensions and being completely interchangeable with present standard A. R. A. design. Attention is directed to the fact that the outer tubular axle member designated 10 on the drawings, is a construction of such strength that it may serve as an axle by itself independent of the inner axle, this construction being shown in Figure 2, whereas in the roller bearing assembly, it serves together with the inner axle 13 to take the stress usually imparted to railroad axles. In addition, my method of assembly affords means for insuring accurate fit between the parts and the proper clearance for the anti-friction bearings according to the use to which it is to be subjected.

An added advantage of this structure which is made possible by virtue of the interchangeable feature of the wheel and axle with the standard type of journal bearing plates is that in the event the anti-friction bearing should fail, the wheels and outer tubular axle would assume a fixed relationship relative to the inner stationary axle and the turning movement would occur between the inner axle which would then rotate, and the bearing plate in the capacity of the ordinary friction wheel and axle structures. To provide for this, suitable means for lubricating the journal and bearing plates may be provided in the journal box to operate at the time lubricant is needed.

Further, an assembly of the character described may be readily adapted to the use of cars already in existence without the necessity of expensive repairs to effect such an adaptation. It will be noticed that the outer rotary axle terminates within the wheel (Figure 6) and cooperation may readily be effected with existing journals by assembling the structure, allowing the journals to project inwardly of the outer rim of the wheel. Such a structure fulfills all existing requirements of service and requires no expensive outlay to equip present cars with the wheel and axle assemblies of these types.

In view of the fact that the engagement between the outer end of the stationary axle and the bearing plate or brass ordinarily acts to support the side frame of the truck and car without relative rotation between these parts; and in view of the fact that the brasses that are now equipped on cars for the journal bearings are very expensive, it may in some instances be desirable to insert a bearing plate of reduced size and weight which is accordingly less expensive, this bearing plate being of a size and structure sufficient to act as a bearing for a temporary period, but one which will reduce the weight and expense and will for this reason in some instances be desirable.

I claim:

1. A railroad car axle construction comprising a tubular axle, and wheels fixed on the ends thereof, said axle being constructed to selectively receive anti-friction bearings at its ends and a stationary axle therethrough supported within said bearings, or a journal bearing member in fixed relation with said tubular axle.

2. A railroad car axle construction comprising a tubular axle and wheels fixed on the ends thereof, said tubular axle being constucted to selectively receive a journal bearing member and form therewith the complete axle assembly, or to receive a stationary axle therethrough and anti-friction bearings between said axles.

3. A railroad car axle construction comprising a tubular axle and wheels fixed on the outer ends thereof, a second axle extending through and beyond the extremities of said tubular axle, and an obliquely disposed anti-friction bearing mounted between said axles, and means on said second axle for locking the anti-friction bearing against displacement.

4. A railroad car axle construction comprising a tubular axle and wheels fixed on the outer ends thereof, a second axle extending through and beyond the extremities of said tubular axle and spaced therefrom, and anti-friction bearings mounted between said axles, each of said bearings having a housing carried by said tubular axle for substantially closing the opening between said axles.

5. A railroad car axle construction comprising two axles positioned one within the other in spaced relation, anti-friction bearings mounted therebetween, wheels fixed on the ends of the outer axle, means on the outer axle for closing the opening between axles, and means in the outer axle for permitting the introduction of lubricant into the space provided between said axles.

6. A railroad car axle construction comprising a pair of spaced wheels fixed on the ends of a tubular axle, a second axle extending through said tubular axle and having an inner race ring of an anti-friction bearing mounted thereon, said tubular axle having the outer racering of an anti-friction bearing mounted therein, and angularly disposed anti-friction members positioned between said inner and outer race rings.

7. A railroad car axle construction comprising a stationary axle constructed to cooperate with journal boxes at its ends, angularly disposed anti-friction bearings on said axle, a tubular axle rotatably mounted relative to said stationary axle on said anti-friction bearings, and wheels fixed on said tubular axle.

8. A railroad car axle construction comprising a stationary axle constructed to cooperate with journal boxes at its ends, anti-friction bearings on said axle, a tubular axle rotatably mounted relative to said stationary axle on said anti-friction bearings, and wheels fixed on said tubular axle, said tubular axle being spaced from said stationary axle to form a lubricant chamber, cover plates disposed between said axles for closing said lubricant chamber, said cover plates being disposed within the planes defining inner and outer portions of the wheel treads.

9. A railroad car axle construction comprising a stationary axle constructed to cooperate with journal boxes at its ends, anti-friction bearings on said axle, a tubular axle rotatably mounted relative to said stationary axle on said anti-friction bearings, and wheels fixed on said tubular axle, said tubular axle being spaced from said stationary axle to form a lubricant chamber, said anti-friction bearing having a housing member for substantially closing the ends of said lubricant chamber.

10. A railroad car axle construction comprising a stationary axle constructed to cooperate with journal boxes at its ends, anti-friction bearings on said axle, a tubular axle rotatably mounted relative to said stationary axle on said anti-friction bearings, wheels fixed on said tubular axle, and adjustable means mounted on said stationary axle for determining and maintaining the position of said anti-friction bearings.

11. A railroad car axle construction comprising a stationary axle constructed to cooperate with journal boxes at its ends, anti-friction bearings on said axle, a tubular axle rotatably mounted relative to said stationary axle on said anti-friction bearings, wheels fixed on said tubular axle, and adjustable means mounted on said stationary axle for determining and maintaining the position of said anti-friction bearings, said adjustable means each having a member thereon for seating within journal boxes.

12. A railroad car axle construction comprising a pair of spaced wheels having enlarged hub openings, a tubular axle, the ends of which are positioned in said hub openings and fixed to said wheels, and journal members each having a bearing hub portion and a cup portion, said cup portion fitting within the open ends of and fixed to said tubular axle.

13. A railroad car wheel and axle assembly including a stationary axle and a tubular axle, anti-friction bearings mounted between said axles, and assembled as a unit, means for maintaining said bearings in assembled position, and wheels fixed to said tubular axle capable of removal and replacement without disturbing said assembly.

14. A railroad car axle comprising a hollow central portion, journal hub portions, said journal hub portions having a solid bearing hub and a cupped end, said cupped ends being fitted in the ends of and fixed relative to said hollow central portion.

15. A railroad car axle comprising a hollow central portion, journal hub portions, said journal hub portions having a solid bearing hub and a cupped end, said cupped ends being fitted in the ends of and fixed relative to said hollow central portion, the cavity in one of said cup portions extending beyond the end of said hollow central portion when in assembled relation.

16. A railroad car wheel and axle construction comprising a rotatable tubular axle having wheels mounted thereon, said tubular axle being constructed to selectively receive a journal bearing portion for carrying a journal box and supporting the load of the car, or anti-friction bearings and a stationary axle positioned therethrough and constructed to carry said journal box and support the load of the car.

17. A railroad car axle construction comprising a tubular axle and wheels fixed on the outer ends thereof, a second axle extending through and beyond the extremities of said tubular axle and spaced therefrom, and an anti-friction bearing mounted between said axles, said bearing having rollers disposed in only a single row and being provided with means for taking lateral thrusts.

18. A railroad car axle construction comprising an inner stationary axle, and an outer rotating axle, with anti-friction bearings mounted therebetween, said anti-friction bearings having an outer race ring with a tapered outer surface, seated on a cooperating tapered seat in said outer rotating axle, whereby proper seating of said anti-friction bearings may be effected by axial movement of said bearings relative to said outer rotating axle.

19. A railroad car axle construction comprising an inner stationary axle and an outer rotating axle, having wheels removably fastened on the ends thereof, anti-friction bearings mounted between said axles, said anti-friction bearings having an outer race ring with a tapered outer surface, seated on a cooperating tapered seat in said outer rotating axle, whereby proper seating of said anti-friction bearings may be effected by axial movement of said bearings relative to said outer rotating axle.

20. A railroad car axle construction comprising a stationary axle constructed to cooperate with journal boxes or truck side frames at its ends, anti-friction bearings on said axle, a tubular axle mounted on said anti-friction bearings and wheels fixed on said tubular axle, said anti-friction bearings being of a tapered roller type carrying both vertical loads and end thrust.

21. A railroad car axle construction including an inner substantially stationary axle and a cooperating wheeled outer axle, said inner axle having an anti-friction bearing on each end carrying the vertical load imparted thereto, one of said anti-friction bearings being constructed to carry the lateral load in one direction and the other anti-friction bearing to carry the lateral load in the opposed direction so that lateral movements of the inner axle in either endwise direction, is opposed by the two bearings.

22. A railroad car axle construction as described having an anti-friction bearing at each end, each of said bearings having a double race of tapered or oblique rollers in opposing position, the inner races of which anti-friction bearings being fixed against movement on the inner axle so that the anti-friction bearings carry both the vertical and lateral load from the inner axle to the car wheels.

23. A wheel and axle assembly including a tubular axle having wheels fixed on the outer ends thereof, a second axle extending through and beyond the extremities of said tubular axle and spaced therefrom by anti-friction bearings of a design to carry the radial load between said axles, said outer tubular axle being provided with a thrust collar in bearing engagement with a second thrust collar carried on said second axle whereby the lateral thrust against the inner axle is transmitted to the outer axle and wheels by such frictional thrust bearing, said thrust bearings at opposite ends being disposed in opposed relation.

24. An anti-friction railroad wheel and axle assembly as described, having a stationary axle terminating within a truck journal box and provided with means by which said stationary axle is held against inward movement by lugs on the sides of the journal box and against outward movement by lugs under the upper side of the journal box.

25. An anti-friction wheel and axle assembly as described, having a stationary axle positioned within a railroad truck journal box and having said stationary axle provided with means to carry the weight of the journal box on the upper side of the axle, said stationary axle being provided with means for engaging lugs on the journal box whereby endwise displacement of the axle within the journal box is prevented.

26. A railroad wheel and axle assembly with anti-friction bearings having a stationary inner axle projecting outwardly beyond the hubs of the wheels, said stationary axle constructed and proportioned to be interchangeable with the wheel and axle assembly known as the American Railway Association's standard, the inner stationary axle carrying the weight and lateral thrusts transmitted by the journal box through the use of a wedge and bearer, all in a manner that provides interchangeability of the anti-friction wheel and axle assembly with that known as the American Railway Association's wheel and axle assembly.

27. In a wheel and axle assembly, the combination of a wheeled axle, bearings therefor, said axle having lubricant recesses for said bearings, said recesses including axle portions flaring in a direction outwardly substantially from the center of the assembly, the wheels being mounted on said flared portions.

28. In a wheel and axle assembly, the combination of a wheeled axle, bearings therefor, said axle having lubricant recesses for said bearings, said recesses including axle portions flaring in a direction outwardly from the center of the assembly and terminating within the plane defining the outer edge of the wheel tread and fixed to said wheels.

29. In a wheel and axle assembly, the combination of a wheeled rotary axle, and a fixed axle, one of said axles terminating within the plane defining the outer edge of the wheel tread of the wheels and provided with flanges for limiting the seating engagement of said wheels.

30. In a wheel and axle assembly, the combination of a wheeled rotary axle, and a fixed axle, the rotary axle terminating within the plane defining the outer edge of the wheel tread of the wheels and forming an outwardly directed lubricant recess for bearings cooperating with said assembly.

31. In a wheel and axle assembly, the combination of a wheeled rotary axle, a fixed axle, one of said axles terminating within the plane defining the outer edge of the wheel tread of the wheels and forming an outwardly directed lubricant recess, bearings in said recess and between said axles, and journals for said assembly extending within the space between the planes defining the tread of said wheels.

32. In a wheel and axle assembly, the combination of a tubular axle having spaced wheels fixed thereto, an axle extending through said tubular axle and extending beyond the ends thereof for cooperation with a truck side frame or the like, and anti-friction bearings disposed between said axles in a single row and in direct communication with said tubular axle for receiving lubricant therefrom, said bearings being disposed within planes defining the outer edges of each wheel tread.

33. In a wheel and axle assembly, the combination of an outer axle having spaced wheels fixed thereto, an inner fixed axle extending through said outer axle, anti-friction bearings disposed between said axles and having race rings, one of said rings being carried by each of said axles, a member carried by said outer axle for closing the end openings between axles, said member having a flange press-fitted into said outer axle for retaining said member in operative position.

34. A wheel and axle unit including a wheeled rotary axle, said axle being provided with an elongated hub, a wheel having a hub mounted upon said first named hub, the first named hub being at least as long as said second named hub and having a wheel engaging shoulder for positioning said wheel, said first named hub terminating short of the plane defining the outer edge of the wheel tread.

35. A railroad car axle construction comprising a tubular axle and wheels mounted on the outer ends thereof, a second axle extending through and beyond the extremities of said tubular axle, and anti-friction bearings mounted between said axles and in a single row, said bearings being disposed within the planes defining the outer edges of the wheel tread, the ends of said second axle being constructed to support a truck side frame.

36. A railroad car axle construction comprising a tubular axle and wheels mounted on the outer ends thereof, a second axle extending through and beyond the extremities of said tubular axle, and anti-friction bearings mounted between said axles, said bearings being disposed so that the axes thereof are angularly disposed with respect to the axes of said axles, the ends of said second axle being constructed to support a truck side frame.

37. A railroad car axle construction comprising a pair of spaced wheels fixed on the ends of a tubular axle, a second axle extending through said tubular axle and having an inner race ring of an anti-friction bearing mounted thereon, said tubular axle having the outer race ring of an anti-friction bearing mounted therein, and anti-friction bearings positioned between said inner and outer race rings, said bearings being disposed in a single vertical row and being disposed to take vertical load and end thrust.

38. A railroad car axle construction including a stationary axle constructed to cooperate with journal boxes at its ends, anti-friction bearings on said axle, said bearings being disposed in a single vertical row, a tubular axle rotatably mounted relative to said stationary axle on said anti-friction bearings, and wheels mounted on said tubular axle.

39. In a railway wheel and axle assembly, the combination of an inner normally stationary axle, an outer revoluble axle, spaced wheels mounted on one of said axles, anti-friction bearings mounted between said axles, said bearings having inner and outer race-rings, one of said race rings being movable to adjust said bearings.

40. A railroad car axle construction comprising a pair of spaced wheels fixed on the ends of a tubular axle, a second axle extending through said tubular axle and having an inner race ring of an anti-friction bearing mounted thereon, said tubular axle having the outer race ring of an anti-friction bearing mounted therein, and angularly disposed anti-friction bearings positioned between said inner and outer race rings and disposed to take vertical and lateral loads on the surfaces thereof.

41. A railroad car axle construction comprising a pair of spaced wheels fixed on the ends of a tubular axle, a second axle extending through said tubular axle and having an inner race ring of an anti-friction bearing mounted thereon, said tubular axle having the outer race ring of an anti-friction bearing mounted therein, and angularly disposed anti-friction bearings positioned between said inner and outer race rings and disposed to take vertical and lateral loads on the surfaces thereof, said bearings being disposed in a single vertical row.

42. A railroad car axle construction comprising a stationary axle constructed to cooperate with journal boxes at its ends, angularly disposed anti-friction bearings mounted on said axle, said bearings being disposed to take vertical and lateral loads on the surfaces thereof, a tubular axle rotatably mounted relative to said stationary axle on said anti-friction bearings, and wheels mounted on said tubular axle.

43. In a railway wheel and axle assembly, the combination of a pair of axles, spaced wheels mounted on the outer of said axles, anti-friction bearings mounted between said axles, said bearings having inner and outer race rings, said inner race ring being provided with means movable to adjust said bearings.

44. In a railway wheel and axle assembly, the combination of a pair of axles, spaced wheels mounted on the outer of said axles, anti-friction bearings mounted between said axles, said bearings including inner and outer race rings and sloping rollers, one of said race rings being movable to adjust said bearings.

45. In a wheel and axle assembly, the combination of a normally stationary axle, a revoluble axle, wheels mounted on one of said axles, anti-friction bearings mounted between said axles, and a cover plate revoluble with one of said axles and having a portion interposed between said bearings and one of said axles.

46. In a wheel and axle assembly, the combination of an inner normally stationary axle, an outer revoluble axle having a lubricant recess disposed in the end thereof, wheels mounted on said revoluble axle, anti-friction bearings disposed in said lubricant recess and including inner and outer race rings, a cover plate for closing said lubricant recess and extending between said axles, said cover plate having a portion disposed between the outer race ring and a portion of the revoluble axle.

47. In a wheel and axle assembly, the combination of an inner normally stationary axle, an outer revoluble axle having a lubricant recess disposed in the end thereof, wheels mounted on said revoluble axle, anti-friction bearings disposed in said lubricant recess and including inner and outer race rings, a cover plate for closing said lubricant recess and extending between said axles, said cover plate being provided with means for positioning said outer race ring.

48. A railroad car axle construction comprising a pair of spaced wheels fixed on the end of a tubular axle, a second axle extending through said tubular axle and having an inner race ring of an anti-friction bearing mounted thereon, the outer race ring of an anti-friction bearing being disposed to transmit stresses substantially vertically to one of said wheels, and anti-friction bearings positioned between said inner and outer race rings, said bearings being disposed in a single vertical row and being disposed to take vertical load and end thrust.

49. A railroad car axle construction comprising a tubular axle and wheels fixed on the outer ends thereof, a second axle extending through and beyond the extremities of said tubular axle and spaced therefrom, and anti-friction bearings mounted on one of said axles, each of said bearings having a housing carried by one of said axles for substantially closing the opening between said axles.

50. A railroad car axle construction comprising a tubular axle and wheels fixed on the outer ends thereof, a second axle extending through and beyond the extremities of said tubular axle and spaced therefrom, and anti-friction bearings mounted on the second of said axles, each of said bearings having a housing carried by one of said axles for substantially closing the opening between said axles.

51. A railroad car axle construction comprising a tubular axle and wheels fixed on the outer ends thereof, a second axle extending through and beyond the extremities of said tubular axle and spaced therefrom, and anti-friction bearings mounted on the second of said axles, each of said bearings having a housing carried by the second of said axles for substantially closing the opening between said axles.

52. A railroad car axle construction comprising a pair of spaced wheels fixed on the ends of a tubular axle, a second axle extending through said tubular axle and having an inner race ring of an anti-friction bearing mounted thereon, said tubular axle being mounted for rotation on an outer race ring of said anti-friction bearing, and angularly disposed anti-friction members positioned between said inner and outer race rings.

53. A railroad car axle construction comprising a stationary axle constructed to co-operate with journal boxes at its ends, anti-friction bearings on said axle, a tubular axle rotatably mounted relative to said stationary axle on said anti-friction bearings, wheels fixed on said tubular axle, an adjustable means mounted on one of said axles for positioning said anti-friction bearings.

54. A railroad car axle construction comprising a stationary axle constructed to co-operate with journal boxes at its ends, anti-friction bearings on said axle, a tubular axle rotatably mounted relative to said stationary axle on said anti-friction bearings, wheels fixed on said tubular axle, and adjustable means mounted on said tubular axle for positioning said anti-friction bearings.

55. In a wheel and axle assembly, the combination of a tubular axle having spaced wheels fixed thereto, an axle extending through said tubular axle and spaced therefrom to form an auxiliary lubricant recess and extending beyond the ends thereof for cooperation with a truck side frame or the like, one of said axles having a bearing recess, and one of said axles having an adjacent lubricant recess of different cross-sectional area than said auxiliary lubricant recess, and anti-friction bearings for one of said axles disposed in a single row in said bearing recess and in direct communication with said lubricant recess for receiving lubricant therefrom, said bearings being disposed within planes defining the outer edges of each wheel tread.

56. In a wheel axle assembly, the combination of a tubular axle having spaced wheels fixed thereto, said tubular axle having a lubricant recess and a communicating bearing recess, an axle extending through said tubular axle and spaced therefrom to form an auxiliary lubricant recess of different cross-sectional area than said lubricant recess and extending beyond the ends thereof for cooperation with a truck side frame or the like, and anti-friction bearings disposed in a single row in said bearing recess and so that said wheels revolve anti-frictionally with respect to said second named axle, said anti-friction bearings being in direct communication with said lubricant recess for receiving lubricant therefrom, said bearings being disposed within planes defining the outer edges of each wheel tread.

57. In a wheel and axle assembly, the combination of an outer axle having spaced wheels fixed thereto, an inner fixed axle extending through said tubular axle, anti-friction bearings disposed on said inner axle for anti-frictionally mounting said wheel and outer axle thereon, a member carried by said outer axle for closing the end openings between axles, said member having a flange for limiting movement of said anti-friction bearings.

58. A railroad car axle construction comprising a tubular axle having a lubricant recess and wheels mounted on the outer ends of said axle, a second axle extending through and beyond the extremities of said tubular axle and spaced therefrom to form an auxiliary lubricant recess of different cross-sectional area than said lubricant recess, and anti-friction bearings mounted on said second axle for anti-frictionally mounting said wheel and other axle thereon, said anti-friction bearings being in a single row adjacent said lubricant recess and being disposed within the planes defining the outer edges of the wheel tread, the ends of said second axle being constructed to support a truck side frame.

59. A railroad car axle construction comprising a tubular axle and wheels mounted on the outer ends thereof, a second axle extending through and beyond the extremities of said tubular axle, and anti-friction bearings having races rigidly mounted with respect to said axles for anti-frictionally mounting said wheel and other axle thereon, said bearings being disposed so that the axes thereof are angularly disposed with respect to the axes of said axles, the ends of said second axle being constructed to support a truck side frame.

60. The combination of a revoluble tubular member, a member extending through said tubular member and having an inner racering of an anti-friction bearing mounted thereon, said tubular member having the outer race ring of said anti-friction bearing mounted thereon, and angularly disposed anti-friction members positioned between the inner and outer race rings and disposed to take vertical and lateral loads on the surfaces thereof.

61. In a wheel and axle assembly, the combination of a wheeled rotary axle, a fixed axle, bearings between said axles, said wheeled axle terminating within the space between the planes defining the wheel periphery.

62. In a wheel and axle assembly, the combination of a rotary axle provided with a wheel hub receiving portion, a wheel having a hub mounted on said hub receiving portion, a fixed axle, bearings between said fixed axle and said wheel, the said hub receiving portion terminating within the space between the planes defining the wheel periphery.

63. In a wheel and axle assembly, the combination of a rotary axle provided with a wheel hub receiving portion, a wheel having a hub mounted on said hub receiving portion, a fixed axle, bearings between said fixed and rotary axles, the said hub receiving portion terminating within the space between the planes defining the wheel periphery.

64. In a wheel and axle assembly, the combination of a wheeled rotary axle, a fixed axle, one of said axles terminating within the plane defining the outer edge of the wheel tread of the wheels and forming an outwardly directed lubricant recess, bearings in said recess and between said axles, and journals on one of said axles outwardly of said assembly and terminating within the space between the planes defining the wheel periphery.

65. In a wheel and axle assembly, the combination of a wheeled rotary axle, a fixed axle, one of said axles terminating within the plane defining the outer edge of the wheel tread of the wheels and forming an outwardly directed lubricant recess, bearings in said recess and between said axles, and journals on the fixed axle disposed outwardly of said assembly and terminating within the space between the planes defining the wheel periphery.

66. In a wheel and axle assembly, the combination of a wheeled rotary axle, a fixed axle, one of said axles terminating within the plane defining the outer edge of the wheel tread of the wheels and forming an outwardly directed lubricant recess, bearings in said recess and between said axles, and journals on the inner of said axles outwardly of said assembly and terminating within the space between the planes defining the wheel periphery.

67. In a wheel and axle assembly, the combination of a tubular axle having spaced wheels fixed thereto, an axle extending through said tubular axle and spaced therefrom to form an auxiliary lubricant recess and extending beyond the ends thereof for cooperation with a truck side frame or the like, one of said axles having a bearing recess, and one of said axles having an adjacent lubricant recess of different cross sectional area than said auxiliary lubricant recess, and antifriction bearings for one of said axles disposed in a single row in said bearing recess and in direct communication with said lubricant recess for receiving lubricant therefrom.

68. In a wheel and axle assembly, the combination of a tubular axle having spaced wheels fixed thereto, said tubular axle having a lubricant recess and a communicating bearing recess, an axle extending through said tubular axle and spaced therefrom to form an auxiliary lubricant recess of different cross sectional area than said lubricant recess and extending beyond the ends thereof for cooperation with a truck side frame or the like, and anti-friction bearings disposed in a single row in said bearing recess and so that said wheels revolve anti-frictionally with respect to said second named axle, said anti-friction bearings being in direct communication with said lubricant recess for receiving lubricant therefrom.

69. A railroad car axle construction comprising a tubular axle having a lubricant recess and wheels mounted on the outer ends of said axle, a second axle extending through and beyond the extremities of said tubular axle and spaced therefrom to form an auxiliary lubricant recess of different cross-sectional area than said lubricant recess, and anti-friction bearings mounted on said second axle for anti-frictionally mounting said wheel and other axle thereon, said anti-friction bearings being in a single row adjacent said lubricant recess, the ends of said second axle being constructed to support a truck side frame.

70. The combination of a revoluble tubular member, a member extending through and beyond the extremities of said tubular member, and an obliquely disposed anti-friction bearing mounted between said members, and means on said second named member for locking said anti-friction bearing against displacement.

71. The combination of a revoluble tubular member, a member extending through and beyond the extremities of said tubular member, an obliquely disposed anti-friction bearing mounted between said members, and means on one of said members for locking said anti-friction bearing against displacement.

72. The combination of a revoluble tubular member, a member extending through and beyond the extremities of said tubular member and spaced therefrom, and an anti-friction bearing mounted between said members, said bearing having rollers disposed in only a single row and being provided with means for taking lateral thrusts.

73. The combination of a revoluble tubular member, a member extending through and beyond the extremities of said tubular member and spaced therefrom, an anti-friction bearing mounted between said members, said bearing having an outer race ring with a tapered outer surface, seated on a cooperating tapered seat in said tubular member, whereby proper seating of said anti-friction bearings may be effected by axial movement of said bearings relative to said tubular member.

74. The combination of a revoluble tubular member, a member extending through and beyond the extremities of said tubular member and spaced therefrom, an anti-friction bearing mounted between said members, and a cover plate revoluble with one of said members and having a portion interposed between said bearings and one of said axles.

75. The combination of a revoluble tubular member, a member extending through and beyond the extremities of said tubular member, said tubular member having a lubricant recess disposed in the end thereof, anti-friction bearings disposed in said lubricant recess and including inner and outer race rings, a cover plate for closing said lubricant recess and extending between said members, said cover plate having a portion disposed between the outer race ring and a portion of said tubular member.

76. The combination of a revoluble tubular member, a member extending through and beyond the extremities of said tubular member, said tubular member having a lubricant recess disposed in the end thereof, anti-friction bearings disposed in said lubricant recess and including inner and outer race rings, a cover plate for closing said lubricant recess and extending between said members, said cover plate being provided with means for positioning said outer race ring.

77. A railroad car axle construction comprising a tubular axle and wheels fixed on the outer ends thereof, a second axle extending through and beyond the extremities of said tubular axle and spaced therefrom, and anti-friction bearings mounted between said axles, said bearings including inner and outer race rings and anti-friction rollers therebetween, said rollers being disposed in a plurality of courses and angularly disposed with respect to each other.

78. The combination of a revoluble tubular member, a member extending through and beyond the extremities of said tubular member, anti-friction bearings between said members, said bearings including inner and outer race rings and anti-friction rollers therebetween, said rollers being disposed in a plurality of courses and angularly disposed with respect to each other.

Signed at Chicago, Illinois, this 8th day of April, 1927.

ALFRED H. OELKERS.